(12) United States Patent
Nakano et al.

(10) Patent No.: US 6,825,895 B2
(45) Date of Patent: Nov. 30, 2004

(54) LIQUID-CRYSTAL DISPLAY APPARATUS

(75) Inventors: Yuuki Nakano, Osaka (JP); Toshihiko Ariyoshi, Osaka (JP); Seiji Umemoto, Osaka (JP); Hideo Abe, Osaka (JP); Ryoji Kinoshita, Osaka (JP)

(73) Assignee: Nitto Denko Corporation, Osaka (JP)

( * ) Notice: Subject to any disclaimer, the term of this patent is extended or adjusted under 35 U.S.C. 154(b) by 81 days.

(21) Appl. No.: 10/098,145

(22) Filed: Mar. 15, 2002

(65) Prior Publication Data

US 2003/0038916 A1 Feb. 27, 2003

(30) Foreign Application Priority Data

Mar. 16, 2001 (JP) .......................... 2001-076396
Apr. 9, 2001 (JP) .......................... 2001-109555

(51) Int. Cl.[7] ............................ G02F 1/1335
(52) U.S. Cl. .................. 349/63; 349/159; 349/62; 349/61; 362/31; 362/32
(58) Field of Search ................. 349/61–68; 362/31, 362/32

(56) References Cited

U.S. PATENT DOCUMENTS

| 5,699,139 | A | * | 12/1997 | Aastuen et al. ........... 349/156 |
| 6,266,108 | B1 | * | 7/2001 | Bao et al. ................... 349/63 |
| 6,323,919 | B1 | * | 11/2001 | Yang et al. ................ 349/63 |
| 6,340,999 | B1 | * | 1/2002 | Masuda et al. ............. 349/63 |
| 6,425,675 | B2 | * | 7/2002 | Onishi et al. .............. 362/31 |
| 6,445,504 | B1 | * | 9/2002 | Suga et al. ............... 359/599 |
| 6,515,729 | B1 | * | 2/2003 | Hoshino .................... 349/158 |

FOREIGN PATENT DOCUMENTS

| EP | 0 867 747 A | 9/1998 |
| EP | 1 154 306 A | 11/2001 |
| JP | 2000-147499 | 5/2000 |

OTHER PUBLICATIONS

Patent Abstracts of Japan, vol. 018, No. 036 (P–1678), Jan. 19, 1994 & JP 05 264978 A (Idemitsu Kosan Co Ltd), Oct. 15, 1993 (abstract).

* cited by examiner

*Primary Examiner*—Toan Ton
*Assistant Examiner*—Richard H Kim
(74) *Attorney, Agent, or Firm*—Sughrue Mion, PLLC

(57) ABSTRACT

A liquid-crystal display apparatus having a liquid-crystal panel, the liquid-crystal panel including a lower transparent substrate having a transparent electrode on at least one of its opposite surfaces, an upper transparent substrate having a transparent electrode opposite to the transparent electrode of the lower substrate, and liquid crystal held between the lower substrate and the upper substrate, wherein the upper substrate is thicker than the lower substrate. Preferably, the thickness of the lower substrate is not larger than ⅔ as large as the thickness of the upper substrate in order to achieve reduction in thickness and weight more effectively.

13 Claims, 3 Drawing Sheets

LIQUID-CRYSTAL DISPLAY APPARATUS

The present application is based on Japanese Patent Applications No. 2001-076396 and 2001-109555, which are incorporated herein by reference.

BACKGROUND OF THE INVENTION

1. Field of the Invention

The present invention relates to a liquid-crystal display apparatus having substrates which are little bent and hardly broken by pressure so that a display image is little disordered.

2. Description of the Related Art

A liquid-crystal display apparatus (hereinafter also abbreviated to "LCD") is used in a desktop electronic calculator, an electronic clock, a personal computer, or a word processor. The demand for the liquid-crystal display apparatus has increased rapidly in recent years. The application of the LCD has been widened. Reduction in thickness and weight of a liquid-crystal display panel has been required with the popularization of portable information apparatuses such as a cellular phone and a PAD in recent years. Accordingly, the LCD as a whole needs to be as thin in thickness as possible and as light in weight as possible. Further, it is preferable that the LCD is hard to break because, in most cases, the LCD has been used for portable purposes in recent years.

In the liquid-crystal display apparatus, upper and lower transparent substrates as constituent members of the apparatus were equal in thickness to each other. If reduction in thickness and weight was attended to be attained, the upper and lower transparent substrates were too thin to obtain sufficient stiffness against external force. For this reason, there was a problem that the cell gap varied to cause disorder of a display image when pressure was applied on the upper transparent substrate.

In order to make the strength against external force sufficient, the upper and lower transparent substrates needed to be made thick. This attempt was, however, contrary to the purpose of reduction in thickness and weight of the LCD. On the other hand, when the transparent substrates were made thin and impact was applied on the LCD, there was another problem that the LCD was easy to break.

On the other hand, as a reflection type LCD (liquid-crystal display) apparatus which can used both in an external light mode and in an illumination mode, there is heretofore known an apparatus using a front light system in which a side light pipe is disposed on a visual side surface of a liquid-crystal display panel so that display light can be viewed through the light pipe (Japanese Patent Laid-Open No. 147499/2000). The side light pipe, however, needs a plate thickness of about 2 mm or greater because of necessity in light transmission. Hence, there was a problem that increase in thickness and weight of the liquid-crystal display apparatus could not be avoided. Therefore, reduction in thickness and weight is an important issue particularly in a reflection type liquid-crystal display apparatus used in a portable system such as a portable personal computer or a cellular phone. In a thickness and weight reducing system in which cell substrates in a liquid-crystal display panel are made thin, there arises a disadvantage in that the panel is easy to break because of deterioration of mechanical strength.

SUMMARY OF THE INVENTION

An object of the invention is to provide a liquid-crystal display apparatus which is thin in thickness, light in weight, hard to break and easy to view.

The invention is devised on the basis of the knowledge that the stiffness of a liquid-crystal portion is determined by the stiffness of upper and lower transparent substrates of an LCD because each of the transparent substrates is bonded only around its circumference, and that the lower transparent substrate may be thinner than the upper transparent substrate because a large part of pressure is applied on the LCD particularly against the front surface thereof, that is, because pressure is little applied on the lower transparent substrate.

That is, in accordance with the invention, there is provided a liquid-crystal display apparatus having a liquid-crystal cell, the liquid-crystal cell including a lower transparent substrate having a transparent electrode on at least one of its opposite surfaces, an upper transparent substrate having a transparent electrode opposite to the transparent electrode of the lower substrate, and liquid crystal held between the lower substrate and the upper substrate, wherein the upper substrate is thicker than the lower substrate.

In order to achieve reduction in thickness and weight of the liquid-crystal display apparatus according to the invention more effectively, it is preferable that the thickness of the lower substrate is not larger than ⅔ as large as the thickness of the upper substrate.

In order to make the liquid-crystal display apparatus according to the invention harder to break, it is preferable that the lower substrate is constituted by a member having flexibility.

Assume two cases in the liquid-crystal display apparatus as follows. One is the case where the thicknesses of the upper and lower transparent substrates are equal to each other and, for example, each of the thicknesses is 0.6 mm. The other is the case where the total thickness of the upper and lower transparent substrates is equal to that in the former case and, for example, the thickness of the upper transparent substrate is 1.0 mm and the thickness of the lower transparent substrate is 0.2 mm. In the case where the thicknesses of the upper and lower transparent substrates are equal to each other, the strengths of the two substrates are also equal to each other. In the case where the thicknesses of the upper and lower transparent substrates are-different from each other in the same manner as in the invention, the strengths of the two substrates are also different from each other. When the same material is used to form the upper and lower substrates, the thicker substrate has stronger stiffness so that strain of display can be reduced.

As described above, the LCD is, however, often used in the environment that pressure is mainly applied on the upper transparent substrate. Accordingly, stiffness in the case where the upper transparent substrate is made as thick as 1.0 mm is stronger than that in the case where the thicknesses of the upper and lower transparent substrates are equal to each other. Hence, strain in the former case is smaller than that in the later case. When the same material is used, the thinner substrate is more advantageous in flexibility. Hence, the lower transparent substrate has larger flexibility as its thickness is thinner, so that the lower transparent substrate can follow bending of the upper transparent substrate, and, accordingly, can act in the direction of further reducing the influence of the bending on the whole display.

From the description, in the case where the thicknesses of the upper and lower transparent substrates in the liquid-crystal display apparatus are equal to each other, each of the thicknesses needs to be 1.0 mm and the total thickness needs to be 2.0 mm in order to obtain the same strength as that in the case where the upper transparent substrate is 1.0 mm. However, when the upper transparent substrate is made thicker than the lower transparent substrate, sufficient strength can be obtained even in the case where the total thickness is kept constant. Accordingly, when the upper transparent substrate is made as thick as possible and the lower transparent substrate is made as thin as possible relative to the total thickness of the liquid-crystal display apparatus, strain and disorder of a display image can be reduced.

According to the invention, there is also provided a reflection type liquid-crystal display apparatus having: a reflection type liquid-crystal display panel; at least one illuminator; and an optical path control layer, the liquid-crystal display panel including a liquid-crystal cell and a reflection layer, the liquid-crystal cell having a back side cell substrate, a visual side cell substrate, and a layer of liquid crystal, the back side cell substrate being made of a support substrate at least having an electrode provided thereon, the visual side cell substrate being made of a transparent substrate at least having a transparent electrode provided thereon, the transparent substrate in the visual side cell substrate being thicker than the support substrate in the back side cell substrate, the layer of liquid crystal being held between the back side cell substrate and the visual side cell substrate with their respective electrodes disposed opposite to each other, the reflection layer being provided at the back of the liquid-crystal layer in the liquid-crystal cell so that external light incident on an outer surface of the visual side cell substrate is reflected by the reflection layer and so that display light transmitted through the liquid-crystal layer is made to exit from the visual side cell substrate so as to be viewed, the illuminator being disposed on at least one of side surfaces of the liquid-crystal display panel, the optical path control layer having a thickness of in a range from 10 to 300 $\mu$m and provided with light exit portions on the outer surface side of the visual side cell substrate, the light exit portions having optical path changing slopes by which light incident on the side surface through the illuminator is reflected toward the back side cell substrate, each of the optical path changing slopes being inclined at an inclination angle of from 35 to 48 degrees with respect to a reference plane of the liquid-crystal display panel.

According to the invention, it is possible to form a front light mechanism in which the optical path of incident light from an illuminator disposed on one of side surfaces of a liquid-crystal display panel is changed to a viewing direction of the liquid-crystal display panel efficiently through light exit portions of an optical path control layer disposed on the visual side and through a reflection layer disposed on the back side so that the light can be used for liquid-crystal display and in which liquid-crystal display can be performed also in an external light mode using incidence of external light. Accordingly, because of the optical path control layer sufficiently thin and the illuminator disposed on the side surface of the panel, it is possible to obtain a reflection type liquid-crystal display apparatus which can be reduced well in thickness and weight, which has the panel hard to break, which is excellent in display quality and which can be used both in an external light mode and in an illumination mode.

That is, in accordance with the invention, incident light from an illuminator disposed on one of side surfaces of a liquid-crystal display panel can be supplied to an optical path control layer while transmitted efficiently through cell substrates of the liquid-crystal display panel, particularly through a visual side transparent substrate. Hence, good emission of light can be achieved even by the optical path control layer considerably thinner than the liquid guide plate. Moreover, the visual side transparent substrate is made thicker than the back side support substrate. Hence, the quantity of light incident on a side surface of the visual side transparent substrate can be increased compared with the case where the thickness of the visual side transparent substrate is made equal to that of the back side support substrate. Hence, display light can be made brighter and the stiffness of the visual side cell substrate subjected to pressure easily can be enhanced so that a display image can be prevented from being disordered due to bending of the visual side cell substrate caused by external light. Hence, it is possible to provide a liquid-crystal display apparatus that is hard to break even in the case where the apparatus has substrates with a total thickness equal to that in the case where the substrates are equal in thickness to each other.

In addition, the light exit portions provided in the optical path control layer have optical path changing slopes each inclined at a predetermined angle. Hence, light incident on the side surface or transmitted light thereof is reflected by the slopes so that the optical path of the light can be changed with good directivity. Further, the optical path of light exhibiting a peak in a direction of regular reflection is controlled so that directivity favorable for display, particularly frontal directivity, can be provided easily. Hence, it is possible to achieve bright liquid-crystal display in an illumination mode. Also in an external light mode, external light can be efficiently taken in the apparatus by use of flat portions other than the optical path changing slopes in the optical path control layer. Hence, it is possible to achieve bright liquid-crystal display in an external light mode as well as in an illumination mode.

Features and advantages of the invention will be evident from the following detailed description of the preferred embodiments described in conjunction with the attached drawings.

DETAILED DESCRIPTION OF THE PREFERRED EMBODIMENTS

The liquid-crystal display apparatus according to the invention has a liquid-crystal panel, the liquid-crystal panel including a lower transparent substrate having a transparent electrode on at least one of its opposite surfaces, an upper transparent substrate having a transparent electrode opposite to the transparent electrode of the lower substrate, and liquid crystal held between the lower substrate and the upper substrate, wherein the upper substrate is thicker than the lower substrate.

Figure 1:
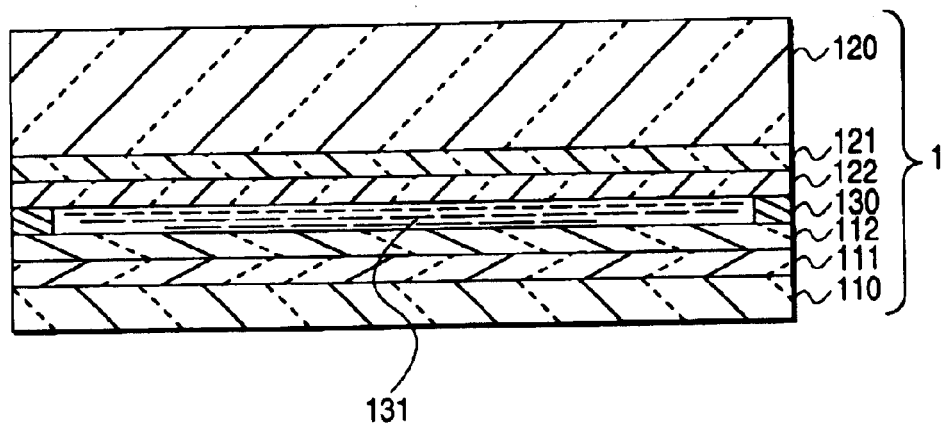
FIG. 1 is a sectional view showing an example of configuration of a liquid-crystal display apparatus according to an embodiment of the invention.

FIG. 1 is a vertical sectional view showing an embodiment of the invention. As an example, a GH (guest-host)

type liquid-crystal display apparatus 1 is shown in FIG. 1. The lower transparent substrate 110 is thinner than the upper transparent substrate 120. A transparent electrode 111 and a rubbing film 112 are provided on one surface of the lower transparent substrate 110. Similarly, a transparent electrode 121 and a rubbing film 122 are provided on the upper transparent substrate 120. These substrates 110 and 120 are disposed so that the transparent electrodes 111 and 121 are opposite to each other. Liquid crystal 131 containing dye as an additive is injected in a region which is formed by sealing a gap between the opposite upper and lower transparent electrodes 121 and 111 with a sealing material 130. In such a manner, the liquid-crystal display apparatus 1 according to the invention is formed.

Figure 2:
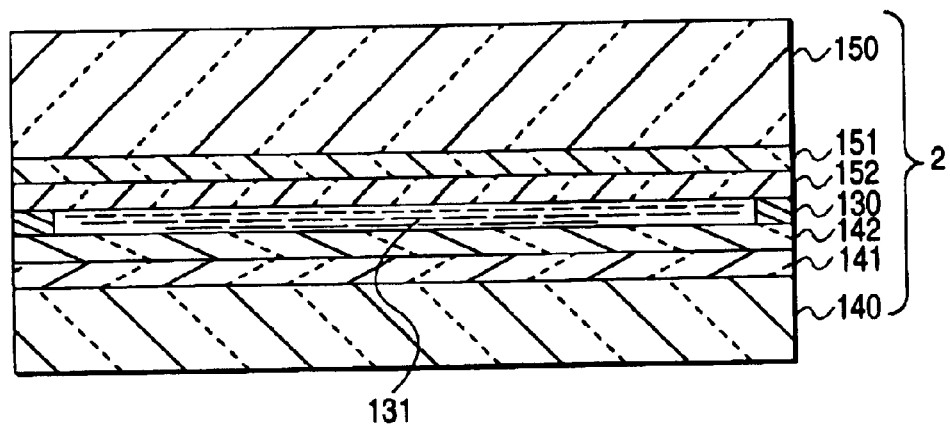
FIG. 2 is a sectional view showing an example of configuration of a liquid-crystal display apparatus.

On the other hand, FIG. 2 is a vertical sectional view showing a comparative liquid-crystal display apparatus 2. The thickness of a lower transparent substrate 140 is equal to that of an upper transparent substrate 150. A transparent electrode 141 and a rubbing film 142 are provided on one surface of the lower transparent substrate 140. Similarly, a transparent electrode 151 and a rubbing film 152 are provided on the upper transparent substrate 150. These substrates 140 and 150 are disposed so that the transparent electrodes 141 and 151 are opposite to each other. Liquid crystal 131 containing dye as an additive is injected in a region which is formed by sealing a gap between the opposite upper and lower transparent electrodes 151 and 141 with a sealing material 130. In such a manner, the liquid-crystal display apparatus 2 is formed.

In the invention, the materials and thicknesses of the upper and lower transparent substrates used for forming the liquid-crystal display apparatus are not particularly limited. To make the liquid-crystal display apparatus thin in thickness, light in weight and hard to break, the thickness of the lower transparent substrate is preferably not larger than $2/3$ as large as the thickness of the upper transparent substrate and is especially preferably in a range of from $1/2$ to $1/10$ as large as the thickness of the upper transparent substrate. Likewise, the thickness of the upper transparent substrate is preferably in a range of from 0.4 to 1.5 mm, more preferably in a range of from 0.5 to 1.0 mm whereas the thickness of the lower transparent substrate is preferably in a range of from 0.1 to 0.7 mm, more preferably in a range of from 0.1 to 0.4 mm.

As the material of each of the upper and lower transparent substrates, it is possible to use a suitable one such as a glass substrate or a plastic substrate. To make the substrate transmit light, a material high in transparency is used preferably. From this point of view, when a glass substrate is used, a colorless transparent material such as non-alkali glass is preferred to blue plate glass. On the other hand, from the point of view of reduction in weight, a plastic substrate is preferred to the glass substrate.

A material small in optical anisotropy is generally used for the plastic substrate, but the material needs to be handled easily in a process of production of a liquid-crystal display apparatus and needs to have the durability that the material is hard to break when external force is applied on the material. Therefore, a polymer high in its glass transition point and excellent in flexibility is preferred as the substrate material. Examples of the polymer include epoxy resin, polyether-sulfone (PES), polyallylate (PA), polycarbonate (PC), and polynorbornene resin. Especially, epoxy resin is preferred. Incidentally, when transparent substrates are used for forming a liquid-crystal cell, the upper and lower transparent substrates may be made of polymers different from each other.

In the invention, the liquid-crystal display apparatus is not particularly limited in type. For example, the liquid-crystal display apparatus may be formed as any type system such as an active matrix drive system or a passive matrix drive system, for example, using thin-film transistors. Specific examples of the system include a twisted nematic (TN) system, a super-twisted nematic (STN) system, a vertical alignment (VA) system, an in-plane switching (IPS) system, a polymer dispersion liquid-crystal (PDLC) system, a guest-host (GH) system, a ferroelectric liquid-crystal (FLC) system, and an electrically controlled birefringence (ECB) system.

In practical use of the liquid-crystal display apparatus according to the invention, other optical layers (optical members) maybe used to be laminated on the liquid-crystal cell. The optical layers are not particularly limited. For example, it is possible to use one suitable optical layer or two or more suitable optical layers, which may be used for forming a liquid-crystal display apparatus, such as a polarizer, an anti-reflection plate, a semi-transparent reflection plate, a retarder plate (inclusive of a λ plate such as a half wave plate or a quarter wave plate), a view angle compensating film, and a luminance enhancement film.

The other optical members can be also formed by a successively and separately laminating method in the process of production of a liquid-crystal display apparatus. The polarizer, the retarder plate and the reflection plate may be integrated with the liquid-crystal cell through an adhesive agent in advance. A laminate of two optical member layers or a laminate of three or more optical member layers is, advantageously, excellent in stability of quality and assembling efficiency and capable of improving efficiency in production of a liquid-crystal display apparatus. Incidentally, a suitable bonding material such as a tackiness agent can be used for the lamination.

As the tackiness agent, it is possible to use a suitable one such as an acrylic-based tackiness agent, a silicone-based tackiness agent, a polyester-based tackiness agent, a polyurethane-based tackiness agent, a polyether-based tackiness agent, or a rubber-based tackiness agent. Especially, an acrylic-based tackiness agent is preferred from the point of view of heat resistance and optical characteristic.

An example of the polarizer used in the invention is a polarizer having a transparent protective film laminated as a protective layer through a suitable adhesive layer on either or each side of a polarizing element made of a polyvinyl-alcohol-based polarizing film containing a dichromatic substance.

A film of a hydrophilic polymer such as polyvinyl alcohol or partially formalized polyvinyl alcohol is subjected to a dyeing process using iodine or dichromatic dye, an orienting process and a crosslinking process in a suitable sequence and method and dried to there by prepare a polarizing element. Then, a transparent protective film made of a polymer film excellent in transparency, mechanical strength, thermal stability, and moisture sealability is stuck onto the polarizing element to thereby form a polarizer. The polarizer obtained thus is generally used. Examples of the polymer used in the polarizer include: polyester-based resin; acetate-based resin; polynorbornene-based resin; polyether-sulfone-based resin; polycarbonate-based resin; polyamide-based resin; polyimide-based resin; polyolefin-based resin; acrylic-based resin; and heat-curable or ultraviolet-curable resin such as acrylic-based resin, urethane-based resin, epoxy-based resin or silicone-based resin.

The retarder plate is used in the case where linearly polarized light is to be converted into elliptically/circularly polarized light or elliptically/circularly polarized light is to be converted into linearly polarized light or the direction of polarization of linearly polarized light is to be changed. Specific examples of the retarder plate include: a birefringent film obtained by orienting a film of a polymer such as polycarbonate, polyvinyl alcohol, polystyrene, polymethyl methacrylate, polypropylene or other polyolefins, polyallylate or polyamide; an alignment film of a liquid-crystal polymer; and an alignment layer of a liquid-crystal polymer supported by a film.

The view angle compensating film is a film that is used for widening the view angle so that an image can be recognized relatively sharply even in the case where the screen of the liquid-crystal display apparatus is viewed not perpendicularly but obliquely to the screen. A triacetyl cellulose film coated with discotic liquid crystal or a retarder plate may be used as the view angle compensating film.

The luminance enhancement film is used to be stuck to a polarizer and generally provided on the rear side of the liquid-crystal cell. A suitable film can be used as the luminance enhancement film. Examples of the suitable film include: a film exhibiting characteristic of transmitting linearly polarized light with a predetermined axis of polarization but reflecting the other light components, such as a multilayer thin film of a dielectric or a multilayer laminate of thin films different in index anisotropy; and a film exhibiting characteristic of reflecting left-handed or right-handed circularly polarized light but transmitting the other light components, such as a cholesteric liquid-crystal layer, especially an alignment film of a cholesteric liquid-crystal polymer or a film made of the aligned liquid-crystal layer supported on a film base material.

The reflection layer is generally provided on the rear side of the liquid-crystal cell. Hence, a liquid-crystal display apparatus of the type of performing display by reflecting light incident on the visual side (display side) can be formed, so that the necessity of building a light source such as a backlight in the liquid-crystal display apparatus can be eliminated. Accordingly, there is an advantage in that reduction in thickness of the liquid-crystal display apparatus can be attained easily. A suitable layer according to the conventional one can be used as the reflection layer. Specific examples of the reflection layer include: a coating layer containing metal foil or metal powder held by a binder; a reflection plate obtained by providing the coating layer on a support base material; a metal vapor deposited layer; and a reflection plate obtained by providing the metal vapor deposited layer on a support base material.

The semi-transparent reflection type polarizer can be obtained by providing the reflection layer as a semi-transparent reflection layer such as a half-silvered mirror reflecting and transmitting light. The semi-transparent reflection type polarizer is provided on the rear side of the liquid-crystal cell. Hence, there can be formed a liquid-crystal display apparatus of the type of displaying an image by reflecting light incident on the visual side (display side) when the liquid-crystal display apparatus is used in a relatively bright atmosphere, and displaying an image by using a built-in light source such as a backlight included in the back side of the semi-transparent polarizer when the liquid-crystal display apparatus is used in relatively dark atmosphere. Incidentally, a half-silvered mirror of a metal film, or a synthetic resin plate containing a pearl pigment can be used as the semi-transparent reflection plate.

The liquid-crystal display apparatus according to the invention can be preferably applied to the formation of a semi-transparent reflection type liquid-crystal display apparatus or a reflection type liquid-crystal display apparatus. When optical members such as polarizers are provided on opposite sides of the liquid-crystal cell, the optical members may be identical to each other or different from each other if the requisites of the invention are satisfied. In addition, one layer or two or more layers of suitable parts such as a prism array sheet, a lens array sheet, a light-diffusing plate, and a backlight may be disposed in suitable positions when the liquid-crystal display apparatus is formed.

Incidentally, the respective layers such as optical layers and tacky layers for forming the polarizer or optical member may be made to have ultraviolet absorptive power by a suitable method such as a method of treating them with an ultraviolet absorbent such as a salicylic ester-based compound, a benzophenone-based compound, a benzotriazole-based compound, a cyanoacrylate-based compound, or a nickel complex salt-based compound.

Further, the reflection type liquid-crystal display apparatus according to the invention has: a reflection type liquid-crystal display panel; at least one illuminator; and an optical path control layer, the liquid-crystal display panel including a liquid-crystal cell and a reflection layer, the liquid-crystal cell having a back side cell substrate, a visual side cell substrate, and a layer of liquid crystal, the back side cell substrate being made of a support substrate at least having an electrode provided thereon, the visual side cell substrate being made of a transparent substrate at least having a transparent electrode provided thereon, the transparent substrate in the visual side cell substrate being thicker than the support substrate in the back side cell substrate, the layer of liquid crystal being held between the back side cell substrate and the visual side cell substrate with their respective electrodes disposed opposite to each other, the reflection layer being provided at the back of the liquid-crystal layer in the liquid-crystal cell so that external light incident on an outer surface of the visual side cell substrate is reflected by the reflection layer and so that display light transmitted through the liquid-crystal layer is made to exit from the visual side cell substrate so as to be viewed, the illuminator being disposed on at least one of side surfaces of the liquid-crystal display panel, the optical path control layer having a thickness of in a range from 10 to 300 $\mu$m and provided with light exit portions on the outer surface side of the visual side cell substrate, the light exit portions having optical path changing slopes by which light incident on the side surface through the illuminator is reflected toward the back side cell substrate, each of the optical path changing slopes being inclined at an inclination angle of from 35 to 48 degrees with respect to a reference plane of the liquid-crystal display panel.

Figure 3:
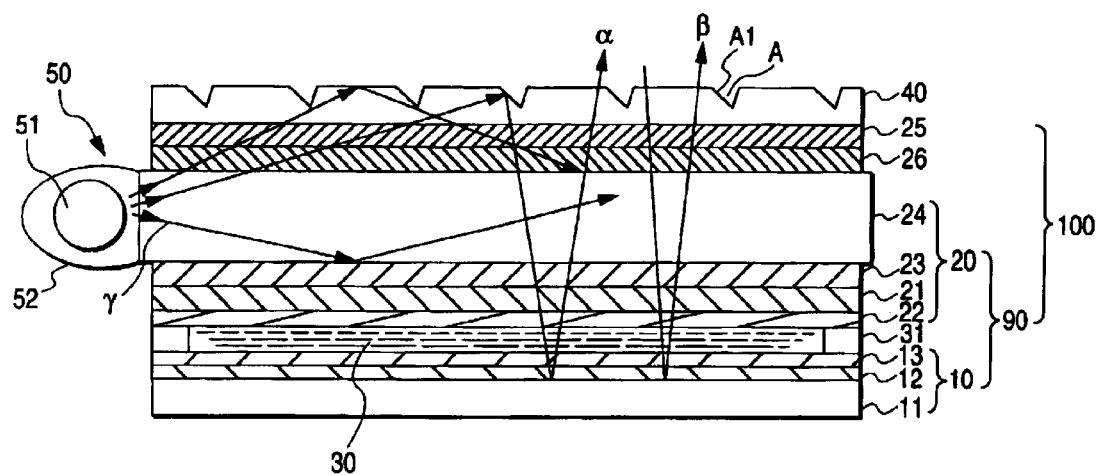
FIG. 3 is an explanatory side view showing an example of a reflection type liquid-crystal display apparatus which can be used both in an external light mode and in an illumination mode.

FIG. 3 shows an example of the reflection type liquid-crystal display apparatus. In FIG. 3, the reference numeral 100 designates a liquid-crystal display panel; 90, a liquid-crystal cell; 10, a back side cell substrate made of a support substrate 11 having an electrode 12 provided, also as a reflection layer, on the support substrate 11; 20, a visual side cell substrate made of a transparent substrate 24 provided with a transparent electrode 21; 30, a liquid-crystal layer; 40, an optical path control layer having light exit portions A provided with optical path changing slopes A1; and 50, an illuminator. Incidentally, in FIG. 3, the reference numerals 13 and 22 designate alignment films respectively; 23, a low-refractive-index transparent layer; 25, a polarizer; 26, a retarder plate; 31, a sealing material for sealing liquid crystal 30 between the cell substrates 10 and 20; 51, a light source; and 52, a reflector.

As shown in FIG. 3, as the liquid-crystal display panel, it is possible to use a suitable reflection type panel including: a liquid-crystal cell; and a reflection layer, the liquid-crystal cell having a back side cell substrate, a visual side cell substrate, and a layer of liquid crystal, the back side cell substrate having a support substrate and at least an electrode provided on the support substrate, the visual side cell substrate having a transparent substrate and at least a transparent electrode provided thereon, the transparent substrate in the visual side cell substrate being thicker than the support substrate in the back side cell substrate, the layer of liquid crystal being held between the back side cell substrate and the visual side cell substrate with their respective electrodes disposed opposite to each other, the reflection layer being provided at the back of the liquid-crystal layer in the liquid-crystal cell so that external light incident on an outer surface of the visual side cell substrate on which the optical path control layer is disposed is reflected by the reflection layer and so that display light inverted by the reflection and transmitted through the liquid-crystal layer is made to exit from the visual side cell substrate so as to be viewed. The liquid-crystal display panel is not particularly limited in kind.

Incidentally, specific examples of the liquid-crystal cell described above are classified by the aligning format of liquid crystal into a twisted or non-twisted liquid-crystal cell such as a TN liquid-crystal cell, an STN liquid-crystal cell, a vertically aligned liquid-crystal cell, an HAN liquid-crystal cell or an OCB liquid-crystal cell; a guest-host or ferroelectric liquid-crystal cell; and a liquid-crystal cell using light diffusion. A system for driving the liquid crystal may be also a suitable one, such as an active matrix system or a passive matrix system. The liquid crystal is usually driven through the electrodes 12 and 21 provided in the inner side of the pair of cell substrates 10 and 20 respectively as shown in FIG. 3.

As for the visual side cell substrate, a transparent substrate is used so that display light can be transmitted through the transparent substrate. The transparent substrate can be made of a suitable material such as glass or resin. Particularly, a substrate made of an optically isotropic material is preferred from the point of view of suppression of birefringence as sufficiently as possible to reduce light loss. In addition, a material excellent in colorlessness and transparency, such as a no-alkali glass plate which surpasses a blue glass plate, is preferred from the point of view of improvement in luminance and display quality. Further, a resin substrate is preferred from the point of view of reduction in weight.

On the other hand, as for the support substrate of the back side cell substrate, any suitable substrate 11 can be used and the substrate may be a colored substrate because the support substrate need not be light-transmissible when the electrode 12 serving also as a reflection layer is provided in the liquid-crystal cell 90 as shown in FIG. 3. In this case, a black substrate maybe preferred from the point of view of black display when the liquid-crystal cell is of the type achieving display on the basis of light scattering or transmission/absorption difference. On the other hand, the transparent substrate may be used when the reflection layer is disposed outside the liquid-crystal cell so that the back side cell substrate needs to be light-transmissible or if light from an illuminator disposed on a side surface of the liquid-crystal cell is made incident on the back side cell substrate, particularly on the support substrate thereof. The material of the transparent substrate may be similar to that of the visual side cell substrate.

The thickness of the transparent substrate in the visual side cell substrate and the thickness of the support substrate in the back side cell substrate may be determined suitably in accordance with the strength of enclosure of liquid crystal, without any specific limitation except that the transparent substrate is made thicker than the support substrate. Generally, each of the thicknesses is selected to be in a range of from 10 μm to 5 mm, particularly in a range of 50 μm to 3 mm, more particularly in a range of from 100 μm to 2 mm from the point of view of balance between transmission efficiency of light incident on the side surface and reduction in thickness and weight of the cell substrates. When the visual side cell substrate 20 is used as a substrate for transmitting incident light received from the illuminator 50 as shown in FIG. 3, it is preferable from the point of view of efficiency of incidence of light and efficiency of transmission of light that the sectional area of the transparent substrate is as large as possible.

In the case, it is preferable from the point of view of reduction in thickness and weight that the back side cell substrate is as thin as possible. Accordingly, the thickness of the support substrate in the back side cell substrate is preferably selected to be not larger than ⅔, particularly in a range of from 5 to 60%, more particularly in a range of from 10 to 50% as large as that of the transparent substrate in the visual side cell substrate. The transparent substrate may have a uniform thickness or may be shaped like a wedge in section so that the thickness thereof changes partially for the purpose of improving efficiency of incidence of transmitted light onto the optical path changing slopes on the basis of the inclination arrangement of the optical path control layer. The support substrate may be shaped in the same manner.

Further, the plan size of the visual side cell substrate and the plan size of the back side cell substrate may be equal to each other or may be different from each other. When the visual side cell substrate is used as a substrate for transmitting incident light received from the illuminator, it is preferable that the side surface formed by the visual side cell substrate 20, as shown in FIG. 3, is protruded more than the side surface formed by the back side cell substrate 10 at least in the side surface where the illuminator 50 is disposed, from the point of view of efficiency of incidence of light in the case where the illuminator is disposed on the protruded side surface.

The transparent electrode provided on the transparent substrate in the visual side cell substrate or the transparent electrode provided on the support substrate in the back side cell substrate in accordance with necessity can be made of any suitable material such as ITO in accordance with the related art. On the other hand, the electrode 12 provided on the support substrate 11 in the back side cell substrate 10 in accordance with necessity and serving also as a reflection layer can be made of a suitable reflective metal as shown in FIG. 3. The electrode 12 may be preferably formed as a thin film of a high-reflectance good-electrical-conductive metal such as aluminum. In this case, when the visual side cell substrate is used as a substrate for transmitting incident light received from the illuminator, the visual side cell substrate may be provided as a scattering reflection layer because light transmitted in the substrate hardly reaches the reflection layer so that the transmitted light can be prevented from being disturbed by scattering reflection until the light is reflected by the optical path changing slopes of the optical path control layer.

The reflection layer provided at the back of the liquid-crystal layer in the liquid-crystal cell, that is, inside or outside the back side cell substrate is provided so that incident light from the illuminator 50 or transmitted light thereof is reflected by the optical path changing slopes A1 of the light exit portions A in the optical path control layer 40 as represented by the broken-line arrow in FIG. 3. Hence, the optical path of the light is changed toward the back side cell substrate, so that the light is reflected/inverted by the reflection layer. That is, the reflection layer is provided for obtaining display light α in an illumination mode. Further, incident external light through the flat or gently inclined portions of the optical path control layer except the optical path changing slopes is reflected/inverted by the reflection layer. That is, the reflection layer is also provided for obtaining display light β in an external light mode. Thus, a reflection type liquid-crystal display apparatus which can be used both in an external light mode and in an illumination mode is formed.

The reflection layer, particularly the reflection layer provided outside the liquid-crystal cell, may be formed out of a suitable material such as a white sheet according to the related art. Particularly, examples of the reflection layer are: a coating layer containing powder of a high-refractive-index metal such as aluminum, silver, gold, copper, or chromium, or an alloy of such metals in a binder resin; a layer of such a metal or a dielectric multi-layer film deposited by a suitable thin film forming system such as a vacuum vapor deposition system or a sputtering system; a reflection sheet having such a coating or deposited layer supported by a substrate made of a film; and a sheet of metal foil.

The reflection layer to be formed may exhibit a light-scattering function as described above. Reflected light may be diffused by a scattering reflection surface so that the frontal directivity can be enhanced. In addition, when such a light-scattering function is based on surface roughing, production of Newton's rings due to tight contact is prevented so that visibility can be improved. Therefore, the reflection layer to be provided outside the cell maybe simply placed without adhesion or may be disposed closely by an adhering system or a vapor deposition system.

For example, the light-scattering type reflection layer can be formed by a system in which a surface of a film substrate is formed into a fine prismatic structure by a suitable system such as a surface roughening system using sandblasting or matting, or a particle addition system, and a reflection layer is provided on the film substrate so as to mirror the fine prismatic structure. The fine prismatic structure reflection layer mirroring the fine prismatic structure on the surface of the substrate can be formed by a method in which a metal is deposited on the surface of the film substrate by a suitable system such as a vapor deposition or plating system. Examples of the vapor deposition or plating are a vacuum vapor deposition system, an ion plating system, and a sputtering system.

One suitable functional layer or two or more suitable functional layers such as an alignment film made of a film subjected to rubbing for aligning liquid crystal, a color filter for color display, and a low-refractive-index transparent layer, may be provided in accordance with necessity when the liquid-crystal cell is formed. Incidentally, alignment films 13 and 22 are generally formed on the electrodes 12 and 21 respectively so as to be in contact with the liquid crystal 30 as shown in FIG. 3. A color filter is generally provided between the support substrate 11 or the transparent substrate 24 in one of the cell substrates 10 and 20 and a corresponding transparent electrode. Therefore, when the color filter is disposed on the support substrate side, the electrode is provided as a transparent electrode.

On the other hand, the low-refractive-index transparent layer is provided for improving uniformity of brightness in the display screen as a whole in an illumination mode. Incidentally, in the embodiment shown in FIG. 3, a low-refractive-index transparent layer 23 is provided in the visual side cell substrate 20 so as to serve as a layer having a refractive index lower than that of the transparent substrate 24 formed in the visual side cell substrate 20. According to the embodiment shown in FIG. 3, when incident light from the illuminator 50 is transmitted inside the visual side cell substrate 20, the transmitted light is totally reflected on the basis of the refractive index difference between the transparent substrate 24 and the transparent layer 23 so as to be efficiently confined in the visual side cell substrate as represented by the broken-line arrow γ in FIG. 3. Hence, the transmitted light is efficiently transmitted backward so that the transmitted light is evenly supplied to the optical path changing slopes of the optical path control layer at a position far from the illuminator. That is, the low-refractive-index transparent layer 23 is provided for improving uniformity of brightness in the display screen as a whole by changing the optical path on the basis of the reflection through the optical path changing slopes.

When the low-refractive-index transparent layer is provided in the visual side cell substrate as shown in FIG. 3, the low-refractive-index transparent layer is also effective in preventing the transmitted light from being reduced or made uneven. Such reduction or unevenness is caused by the partial change of the transmission state because the transmitted light suffers birefringence or scattering when the transmitted light enters the liquid-crystal layer 30. Hence, the low-refractive-index transparent layer is effective in preventing the display from becoming dark and preventing the display quality from being deteriorated because the display in a neighbor of the illuminator is ghosted in the rear. Further, in the case where a color filter is disposed, the low-refractive-index transparent layer is effective in preventing the transmitted light from being rapidly absorbed to the color filter to thereby avoid reduction in the intensity of the transmitted light. In the reflection type liquid-crystal display apparatus in which incident light from the illuminator is transmitted inside the liquid-crystal layer, the transmitted light is apt to be scattered by the liquid-crystal layer to thereby bring an uneven transmission state. As a result, unevenness or ghosting of exit light occurs to thereby make it difficult to view the display image. Accordingly, it is preferable from the point of view of brightness or display quality that a low-refractive-index transparent layer is provided in the visual side cell substrate and an illuminator is disposed on a side surface of the visual side cell substrate as shown in FIG. 3.

The low-refractive-index transparent layer can be made from a suitable material such as an inorganic or organic low-refractive-index dielectric having a refractive index lower than that of the transparent substrate forming the visual side substrate or the back side substrate, by a suitable system such as a vacuum vapor deposition system or a spin coating system. The material and the method for forming the low-refractive-index transparent layer are not particularly limited.

From the point of view of backward transmission efficiency due to the total reflection, it is preferable that the refractive index difference between the transparent layer and the transparent substrate is as large as possible. It is preferable that the refractive index difference is not smaller than 0.05, particularly in a range of from 0.1 to 0.5. This degree of the refractive index difference has little influence on display quality in an external light mode. Incidentally, when the refractive index difference is 0.1, reflectance of external light in the interface between the transparent layer and the transparent substrate is not larger than 0.1%, that is, reduction of brightness or contrast due to the reflection loss is very small.

The position of arrangement of the low-refractive-index transparent layer can be determined suitably. The low-refractive-index transparent layer is preferably positioned between the transparent substrate and the transparent electrode from the point of view of the transmitted light confinement effect and prevention of the light from entering the liquid-crystal layer. When a color filter is disposed between the transparent substrate and the transparent electrode, the low-refractive-index transparent layer is preferably positioned nearer the transparent substrate than the color filter from the point of view of preventing the absorption loss of the transmitted light from being caused by the color filter. Therefore, the low-refractive-index transparent layer is generally provided directly on the transparent substrate. In this case, the fact that the surface of the transparent substrate where the transparent layer is provided is as smooth as possible, that is, the fact that the transparent layer is as smooth as possible, is favorable to prevention of scattering of the transmitted light. The fact is also preferred from the point of view of avoiding influence on display light. It is preferable from the point of view of the confinement effect and reduction in thickness that the thickness of the low-refractive-index transparent layer is not smaller than 100 nm, particularly not smaller than 200 nm, more particularly in a range of from 400 nm to 5 µm.

The liquid-crystal display panel may contain one suitable optical layer or two or more suitable optical layers such as a polarizer 25, a retarder plate 26, and a light-diffusing layer, added to the liquid-crystal cell as shown in FIG. 3. The polarizer is provided for achieving display by using linearly polarized light as in a TN type or STN type liquid-crystal display panel. The retarder plate is provided for improving display quality by compensation for the retardation caused by birefringence of liquid crystal. The light-diffusing layer is provided for enlargement of a display range due to diffusion of display light, uniformity of luminance due to leveling of bright-line emission through the optical path changing slopes of the optical path control layer, and increase in quantity of light incident on the optical path control layer due to diffusion of light transmitted inside the liquid-crystal display panel. Accordingly, the light-diffusing layer is generally provided between the optical path control layer and the transparent substrate in the visual side cell substrate.

The polarizer may be disposed on each of outer opposite sides of the liquid-crystal cell or may be disposed on one side of the liquid-crystal cell as shown in FIG. 3. As the polarizer, it is possible to use a suitable one without any special limitation. From the point of view to obtain display with a good contrast ratio based on the entrance of highly linearly polarized light, a polarizer with a high degree of polarization can be preferably used. Examples of the polarizer are: an absorption type polarizing film formed in such a manner that a dichromatic substance such as iodine or dichromatic dye is adsorbed to a hydrophilic polymeric film such as a polyvinyl alcohol-based film, a partially formalized polyvinyl alcohol-based film or a partially saponified ethylene-vinyl acetate copolymer-based film, and the resulting film is oriented; and a polarizing film in which a transparent protective layer is provided on either or each side of the absorption type polarizing film.

The formation of the transparent protective layer is preferably performed by use of a material superior in transparency, mechanical strength, thermal stability, and moisture sealability. Examples of the material include: polymer such as acetate-based resin, polyester-based resin, polyether-sulfone-based resin, polycarbonate-based resin, polyamide-based resin, polyimide-based resin, polyolefin-based resin, acrylic-based resin, polyether-based resin, polyvinyl chloride-based resin, styrene-based resin, or norbornene-based resin; and heat-curable or ultraviolet-curable resin such as acrylic-based resin, urethane-based resin, acrylic-urethane-based resin, epoxy-based resin or silicone-based resin. The transparent protective layer may be attached by a method such as a bonding system using the form of a film or a coating system using the form of a polymer solution.

On the other hand, as the retarder plate, it is possible to use a suitable material such as a birefringent film obtained in such a manner that a film made of a suitable polymer as listed in the transparent protective layer is oriented by a suitable system such as a uniaxal or biaxial orienting system, an alignment film of a suitable liquid-crystal polymer such as a nematic or discotic liquid-crystal polymer, or an alignment film having such an alignment layer supported by a transparent substrate. The refractive index of the retarder plate in the direction of the thickness thereof may be controlled under the action of heat-shrinking force of a heat-shrinkable film. The compensating retarder plate is generally disposed between the visual side polarizer and the liquid-crystal cell and/or the back side polarizer and the liquid-crystal cell in accordance with necessity. As the retarder plate, it is possible to use a suitable one in accordance with the wave range. In addition, the retarder plate may be used in the form of two or more layers superposed on each other in order to control optical characteristic such as a retardation.

The illuminator disposed on the side surface of the liquid-crystal display panel is provided so that light used as illumination light for the reflection type liquid-crystal display apparatus is made incident on the side surface of the liquid-crystal display panel. Thus, the reflection type liquid-crystal display apparatus can be made thin in thickness and light in weight by combination of the illuminator and the optical path control layer disposed on the visual side of the panel. The preferred system of arrangement of the illuminator from the point of view to prevent incident light from the illuminator from entering the liquid-crystal layer is a system in which the illuminator is disposed, as described above, on the side surface of the visual side cell substrate, particularly on the side surface which is formed by the visual side cell substrate and which is protruded more than the side surface formed by the back side cell substrate.

As the illuminator, it is possible to use a suitable one. Preferred examples of the illuminator include: a linear light source such as a (cold or hot) cathode tube; a point light source such as a light-emitting diode; an array in which such point light sources are set in a linear or planar array; and a combination of a point light source and a linear light pipe through which incident light from the point light source is converted into light of a linear light source. In the embodiment shown in FIG. 3, the illuminator 50 includes a light source 51, and a reflector 52 in which the light source 51 is enclosed. The illuminator(s) may be disposed on one or two or more side surfaces of the liquid-crystal display panel. When illuminators are disposed on two or more side surfaces, the plurality of side surfaces may be constituted by a combination of opposite side surfaces, by a combination of side surfaces intersecting crosswise vertically and horizontally or by a combination of three or more side surfaces in use of both the combinations.

Lighting the illuminator allows viewing in an illumination mode. When viewing is made in an external light mode, it is unnecessary to light the illuminator. Therefore, the illuminator is made switchable. As the switching system, it is possible to use any suitable one. Any related art system may be used as the switching system. Incidentally, the illuminator may be of a multi-color light emission system which can switch its own emission color. Alternatively, different kinds of light in color may be emitted through different kinds of illuminators.

As shown in FIG. 3, the illuminator may be formed as a combined body in which a suitable assisting unit such as a reflector 52 for enclosing the light source 51 is disposed to guide divergent light of the light source 51 to the side surface of the liquid-crystal display panel, as occasion demands. As the reflector, it is possible to use a suitable reflective sheet such as a resin sheet provided with a high-reflectance metal thin film, a white sheet or a metal foil sheet so that light is reflected at least on the illuminator side. The reflector maybe used as a retention unit also having a function of enclosing the light source in such a manner that end portions of the reflector are bonded to a cell substrate of the liquid-crystal display panel, particularly to end portions of upper and lower surfaces of the visual side cell substrate.

The optical path control layer is provided so that the optical path of incident light from the illuminator 50 disposed on the side surface of the liquid-crystal display panel as shown in FIG. 3 or the optical path of transmitted light of the incident light is changed toward the back side cell substrate of the panel through the optical path changing slopes A1 of the light exit portions A and reflected/inverted by the reflection layer 12 so as to be used as illumination light (display light) The optical path control layer is disposed outside the visual side cell substrate 20 of the liquid-crystal display panel and generally disposed on the visual side surface portion as shown in FIG. 3.

For achieving the object, the optical path control layer 40, as shown in FIG. 3, is formed to have the light exit portions A provided with optical path changing slopes A1 each inclined at an inclination angle of from 35 to 48 degrees with respect to a reference plane (virtual horizontal plane) of the visual side cell substrate in order to reflect incident light from the illuminator to thereby change the optical path of the light into a predetermined direction. Further, in the optical path control layer, a large number of such light exit portions are generally distributed in order to attain reduction in thickness. Incidentally, when a low-refractive-index transparent layer is provided in a cell substrate, particularly in the visual side cell substrate, the optical path control layer is preferably formed as a layer having a refractive index higher than that of the low-refractive-index transparent layer. When the refractive index of the optical path control layer is lower than that of the transparent layer, incident light from the illuminator or transmitted light thereof is apt to be confined in the visual side cell substrate. As a result, incidence of light onto the optical path control layer may be disturbed so that the light can be hardly used as display light.

The light exit portions in the optical path control layer can be modified into any suitable form except that the light exit portions are provided with the optical path changing slopes each having the predetermined inclination angle. From the point of view of changing the optical path to obtain display light excellent in frontal directivity, the optical path control layer is preferably provided as an optical path control layer having light exit portions A provided with optical path changing slopes A1 facing the side surface where the illuminator is disposed, that is, facing the incident side surface, and particularly as an optical path control layer having light exit portions A provided with optical path changing slopes A1 constituted by prismatic structures.

Figure 4:
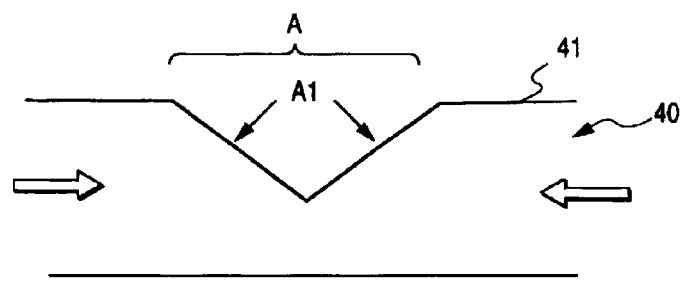
FIG. 4 is an explanatory side view showing an example of the light exit portion.
Figure 5:
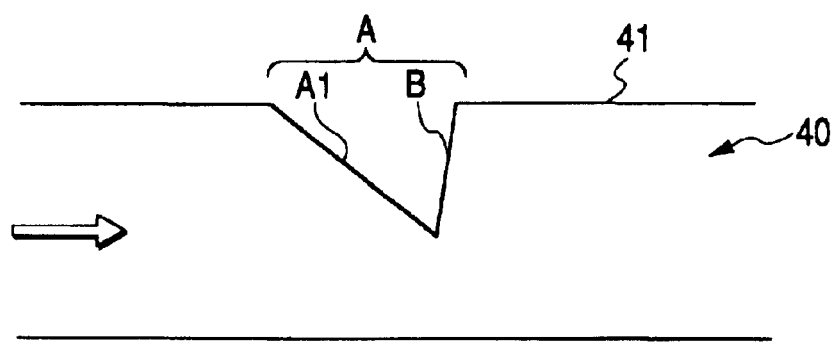
FIG. 5 is an explanatory side view showing another example of the light exit portion.
Figure 6:
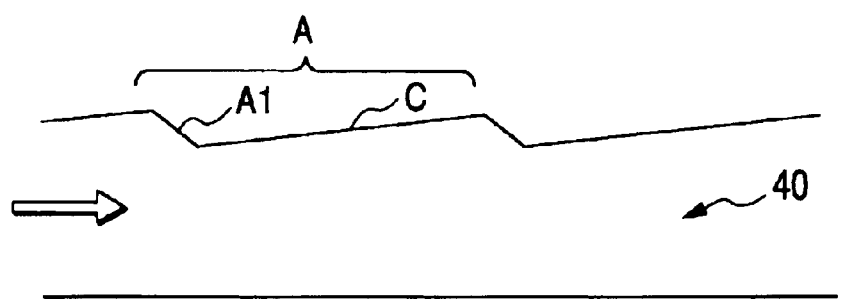
FIG. 6 is an explanatory side view showing a further example of the light exit portion.

FIGS. 4 to 6 show examples of the light exit portions provided with the optical path changing slopes or prismatic structures. In FIG. 4, each of the light exit portions A is provided with two optical path changing slopes A1 constituted by two equal sides of an isosceles triangle. In FIG. 5, each of the light exit portions A is provided with a combination of an optical path changing slope A1 and a steep slope B having an inclination angle larger than that of the slope A1 with respect to the reference plane. In FIG. 6, each of the light exit portions A is constituted by a combination of an optical path changing slope A1 and a gentle slope C having an inclination angle smaller than that of the slope A1 with respect to the reference plane, and the light exit portions A are formed adjacently and continuously as a repetitive structure on the whole of one surface of the optical path control layer.

Accordingly, as described above, the light exit portions may be constituted by prism-like convex or concave portions made of slopes having equilateral faces or equal inclination angles or may be constituted by prism-like convex or concave portions each made of a combination of an optical path changing slope and a steep or gentle slope, or slopes different in inclination angle. The form of the slopes can be determined suitably in accordance with the number of incident side surfaces and the positions thereof. From the point of view of retention of the slope function due to improvement of mar-proofness and efficiency of incidence of transmitted light, the form of prism-like concave portions (grooves) depressed in the surface 41 of the optical path control layer is preferred to the form of prism-like convex portions (protrusions) protruded from the surface 41 as shown in FIGS. 4 to 6. Further, FIGS. 4 to 6 show the case where each of the light exit portions A is shaped like an approximate triangle on the basis of a cross section of the optical path changing slope A1. Although the approximately triangular sectional shape is favorable in that it is easy to form, each of the light exit portions A may have a suitable sectional shape such as an approximately quadrilateral sectional shape or an approximately pentagonal sectional shape. Incidentally, the terminology "approximately" in the sectional shape means that the sectional shape is allowed to be deformed in such a manner that the angles of sides are changed or the angles constituted by points of intersection of sides are rounded off.

From the point of view to attain the characteristic such as frontal directivity, it is preferable that the optical path control layer is formed so that the optical path changing slopes A1 each inclined at an inclination angle of from 35 to 48 degrees with respect to the reference plane as shown in FIGS. 4 to 6 face the incident side surface. Therefore, when illuminators are disposed on two or more side surfaces of the liquid-crystal display panel so that two or more incident side surfaces are provided, it is preferable to use an optical path control layer provided with optical path changing slopes A1 in accordance with the number and positions of the side surfaces. Incidentally, the arrow in FIGS. 4 to 6 shows the direction of transmission of light incident on the incident side surface.

Accordingly, when illuminators are disposed on two opposite side surfaces of the liquid-crystal display panel so that the two side surfaces are provided as incident side surfaces, it is preferable to use an optical path control layer having light exit portions A each provided with two optical path changing slopes A1 and each shaped like an approximate isosceles triangle in section as shown in FIG. 4, or an optical path control layer having light exit portions A each provided with two optical path changing slopes and each shaped like an approximate trapezoid in section so that the ridgelines of the two optical path changing slopes go along the two incident side surfaces respectively. On the other hand, when illuminators are disposed on two side surfaces of the liquid-crystal display panel which are adjacent to each other horizontally and vertically, it is preferable to use an optical path control layer which has optical path changing slopes the ridgelines of which go along two crosswise directions in accordance with the side surfaces respectively. Further, when illuminators are disposed on three or more side surfaces including opposite ones and adjacent ones, it is preferable to use an optical path control layer having optical path changing slopes constituted by the combination of the cases for two side surfaces.

The optical path changing slopes A1 play a role in reflecting light incident on the slopes A1, of light incident on the side surface and transmitted light thereof from the illuminator, to change the optical path of the light to thereby supply the light to the back side of the liquid-crystal display panel. In this case, the inclination angle of each of the optical path changing slopes A1 to the reference plane is set to be in a range of from 35 to 48 degrees. Thus, as represented by the broken-line arrow α in FIG. 3, the optical path of the light incident on the side surface or transmitted light thereof can be changed with good perpendicularity to the reference plane so that display light excellent in frontal directivity can be obtained efficiently. If the inclination angle is smaller than 35 degrees, the optical path of the reflected light through the reflection layer is shifted by 30 degrees from the frontal direction. As a result, it is difficult to use the reflected light effectively for display, so that display quality is also deteriorated. On the contrary, if the inclination angle is larger than 48 degrees, the intensity of light leaked from the optical path changing slopes increases due to the contrariety to the condition that light incident on the side surface or transmitted light thereof is totally reflected. As a result, the efficient utilization of the light incident on the side surface is deteriorated.

From the point of view of the change of the optical path with good frontal directivity and the suppression of light leakage, it is preferable that the inclination angle of each of the optical path changing slopes A1 is in a range of from 38 to 45 degrees, particularly in a range of from 40 to 44 degrees in consideration of the total reflection condition based on the refraction of transmitted light inside the liquid-crystal display panel by Snell's law. Incidentally, the total reflection condition of a glass plate is generally 42 degrees. In this case, light incident on the side surface is therefore incident on the optical path changing slopes while the light is transmitted in a state in which the light is condensed in a range of ±42 degrees.

The light exit portions A having the optical path changing slopes A1 are generally formed as a repetitive structure in order to make the optical path control layer thin as described above. In this case, from the point of view of reflecting light incident on the incident side surface backward and transmitting the reflected light to an opposite side surface efficiently as shown in FIG. 3 so as to emit light from the whole surface of the liquid-crystal display as evenly as possible, the structure is preferably formed as a structure including flat surfaces 41 each having an inclination angle of approximately zero with respect to the reference plane, or as a structure including gentle slopes C each inclined at an inclination angle of not larger than 10 degrees, particularly not larger than 5 degrees, more particularly not larger than 3 degrees with respect to the reference plane as shown in FIGS. 4 to 6. It is therefore preferable that the light exit portions A including steep slopes B as shown in FIG. 5 are provided as a structure in which the angle of each of the steep slopes is set to be not smaller than 35 degrees, particularly not smaller than 50 degrees, more particularly not smaller than 60 degrees, so that the width of each of the flat surfaces 41 can be enlarged.

The flat surfaces 41 or gentle slopes C serve as portions on which display light α in an illumination mode and external light in an external light mode are made incident, and also serve as portions through which display light β reflected by the reflection layer 12 out of the incident light is transmitted, as shown in FIG. 5. Hence, a reflection type liquid-crystal display apparatus which can be used both in an external light mode and in an illumination mode is achieved. In this case, particularly when the optical path control layer is provided as a repetitive structure of the light exit portions A constituted by the slopes A1 and C and repeated adjacently to one another as shown in FIG. 6, it is preferable that the difference between inclination angles of the gentle slopes C with respect to the reference plane is set to be not larger than 5 degrees, particularly not larger than 4 degrees, more particularly not larger than 3 degrees, all over the optical path control layer. Further, it is preferable that the difference between inclination angles of adjacent gentle slopes is set to be not larger than 1 degree, particularly not larger than 0.3 degree, more particularly not larger than 0.1 degree. This is to prevent the optimum viewing direction of the reflection type liquid-crystal display apparatus, particularly the optimum viewing direction in a neighbor of the frontal direction, from being changed largely by transmission of light through the gentle surfaces C and particularly to prevent the optimum viewing direction from being changed largely between adjacent gentle slopes. In addition, from the point of view to obtain bright display in an external light mode, it is preferable that the projected area of the gentle slopes C on the reference plane is set to be not smaller than 5 times, particularly not smaller than 10 times, more particularly not smaller than 15 times as large as that of the optical path changing slopes A1. This is to improve the incidence efficiency of external light and the transmission efficiency of display light reflected by the reflection layer.

The light exit portions A are provided so that their ridgelines, accordingly the optical path changing slopes, go in parallel to or with inclination to the incident side surface of the liquid-crystal display panel on which the illuminator is disposed. In this case, the light exit portions A constituted by prism-like concave portions may be formed continuously from one end of the optical path control layer to the other end thereof or maybe formed discontinuously and intermittently. When the light exit portions A are formed discontinuously, it is preferable that the length of prismatic structure constituted by grooves or protrusions in the direction along the incident side surface, or the length of the long side of optical path changing slopes is set to be not smaller than 5 times as large as the depth of the grooves or the height of the protrusions from the point of view of the incidence efficiency of transmitted light and the optical path changing efficiency. In addition, it is preferable from the point of view of uniform light emission on the display surface of the panel that the length is set to be not larger than 500 μm, particularly in a range of from 10 to 480 μm, more particularly in a range of from 50 to 450 μm.

There is no special limit on the sectional shape of the light exit portions A and on the interval of arrangement of the optical path changing slopes A1. The optical path changing slopes A1 are factors for determining luminance in an illumination mode. Therefore, the optical path changing slopes A1 can be settled suitably in accordance with the uniformity of light emission on the display surface of the panel in the illumination mode and in an external light mode. Thus, the quantity of optical-path-changed light can be controlled by the distribution density of the optical path changing slopes A1. Accordingly, the optical path changing slopes may have a shape with a fixed inclination angle all over the surface of the optical path control layer. Alternatively, in order to make light emission on the display surface of the panel uniform in consideration of absorption loss or attenuation of transmitted light caused by previous changing of its optical path, the light exit portions A maybe made larger as the location thereof goes farther from the incident side surface.

Alternatively, the light exit portions A may be made to be disposed at regular intervals of a fixed pitch or may be made to be disposed at irregular intervals of a pitch reduced gradually to thereby increase the distribution density of the light exit portions A as the location thereof goes farther from the incident side surface. Further, the light exit portions A may be disposed at random to attain uniform light emission on the display surface of the panel. In addition, when the light exit portions A are made of concaves or convexes constituted by discontinuous grooves or protrusions, the size and shape of the concaves or convexes, the distribution density thereof, and the ridgeline direction thereof may be made irregular, or the irregular or regular or standardized concaves or convexes may be arranged at random to attain uniform light emission on the display surface of the panel. Hence, uniform light emission on the display surface of the panel can be achieved by application of a suitable system to the light exit portions A as described above by way of example.

Incidentally, when the optical path changing slopes A1 overlap with pixels of the liquid-crystal cell, display may become unnatural due to insufficient transmission of display light. From the point of view to prevent such unnatural display, it is preferable that the overlapping area is made as small as possible to ensure sufficient light transmittance through the flat surfaces 41 or gentle slopes C. In consideration of not only this point of view but also the fact that the pixel pitch of the liquid-crystal cell is generally in a range of from 100to 300 μm, it is preferable that the optical path changing slopes A1 are formed so that the projected width of the slopes A1 on the reference plane is not larger than 40 μm, particularly in a range of from 3 to 20 μm, more particularly in a range of from 5 to 15 μm. Since the coherent length of a fluorescent tube is generally set to be-about 20 μm, the projected width is preferred also from the point of view to prevent the display quality from deterioration due to diffraction.

On the other hand, from the point of view, it is preferable that the optical path changing slopes A1 are disposed at intervals of a large distance. However, the optical path changing slopes are functional portions for substantially forming illumination light based on changing of the optical path of light incident on the side surface as mentioned above. Accordingly, if the interval is too wide, illumination is sparse at the time of lighting so that display may be unnatural. In consideration of this point, it is preferable that the interval of arrangement of the optical path changing slopes A1 is set to be not larger than 5 mm, particularly in a range of from 20 μm to 3 mm, more particularly in a range of from 50 μm to 2 mm. Further, the structure of arrangement of the light exit portions may interfere with the pixels of the liquid-crystal cell to produce moire. Although prevention of moire can be made by adjustment of the interval of arrangement of the light exit portions, there is a preferred range in the interval of arrangement of the light exit portions as mentioned above. Hence, as measures against the case where moire still occurs though the interval is in the preferred range, the following system is to be discussed. That is, in the invention, there is preferably used a moire preventing system in which the ridgelines of concaves or convexes are formed to be inclined to the incident side surface so that the light exit portions are arranged to cross the pixels.

In the case of the system, when the inclination angle to the incident side surface is too large, deflection may occur in reflection by the optical path changing slopes A1. As a result, large deviation may occur in the changed direction of the optical path. This is apt to cause deterioration of display quality. Therefore, the inclination angle of the ridgelines of the concaves or convexes with respect to the incident side surface is preferably set to be in a range of ±30 degrees, particularly in a range of ±25 degrees. Incidentally, the symbol "±" means the direction of inclination of the ridgelines with the incident side surface as a reference. If the resolution of the liquid-crystal cell is low enough not to produce moire or to make moire negligible, it is preferable that such ridgelines are formed to be as parallel with the incident side surface as possible. As measures against moire, there may be also preferably used a system in which a plurality of light exit portions containing small grooves such as prism-like concave portions or fine protrusions such as prism-like convex portions, each being formed into a size as described above, are distributed discontinuously and irregularly in the surface of the optical path control layer.

The optical path control layer can be made of a suitable material exhibiting transparency corresponding to the wave range of light emitted from the illuminator. Incidentally, examples of the material used in a visible light range include polymer, curable resin, and glass, as listed above in the description of the transparent protective layer by way of example. An optical path control layer made of a material exhibiting no or little birefringence is preferred. From the point of view to make incident light from the illuminator or transmitted light thereof be efficiently incident on the optical path control layer from the visual side cell substrate to thereby achieve bright display through the optical path changing slopes, it is preferable that the optical path control layer is provided so that the refractive index difference between the optical path control layer and the transparent substrate in the visual side cell substrate is not larger than 0.15, particularly not larger than 0.10, more particularly not larger than 0.05. Particularly, it is preferable that the refractive index of the optical path control layer is higher than that of the transparent substrate.

The optical path control layer can be formed by a suitable method. The method for producing the optical path control layer is not particularly limited. Preferred examples of the method for producing the optical path control layers in terms of mass production are: a method in which a thermoplastic resin is pressed against a mold capable of forming predetermined light exit portions under heating to thereby transfer the shape; a method in which a mold capable of forming predetermined light exit portions is filled with a hot-melted thermoplastic resin or a resin fluidized by heat or through a solvent; a method in which a fluid resin or monomer polymerizable by heat, ultraviolet rays electron rays or radial rays is polymerized in the condition that the fluid resin or monomer is cast in a mold capable of forming predetermined light output portions or the mold is filled with the fluid resin; a method in which the fluid resin or monomer is polymerized to be integrated with a transparent film in the condition the transparent film is stuck closely onto a layer filled or cast with the fluid resin or monomer; and a method in which the fluid resin or monomer is applied onto a transparent film and polymerized to be integrated with the film after the applied layer is pressed against a mold capable of forming predetermined light exit portions to be transferred. Hence, the optical path control layer may be formed by adding the predetermined form directly to the visual side substrate, or may be formed as a transparent sheet having the predetermined form added thereto in advance.

From the point of view-to attain reduction in thickness, it is preferable that the thickness of the optical path control layer is set to be in a range of from 10 to 300 $\mu$m, particularly in a range of from 15 to 200 $\mu$m, more particularly in a range of from 20to 100 $\mu$m. Incidentally, when the optical path control layer is formed independently as a transparent sheet, it is preferable from the point of view of efficient incidence of incident light from the visual side cell substrate onto the optical path control layer to achieve bright display that the transparent sheet is bonded to the outer surface side of the visual side cell substrate in the liquid-crystal display panel through an adhesive layer having a refractive index higher than that of the transparent substrate in the visual side cell substrate, particularly an adhesive layer having a refractive index as equal to that of the transparent sheet as possible, more particularly an adhesive layer having a refractive index between that of the transparent sheet and that of the visual side cell substrate. Hence, the refractive index of the adhesive layer can be set in the same manner as in that of the optical path control layer.

The adhesive layer can be made of a suitable transparent adhesive agent. The adhesive agent is not particularly limited in kind. A bonding system using a tacky layer is preferred from the point of view of easiness of the bonding treatment. The tacky layer may be preferably formed of a tackiness agent, using, as base polymer, a suitable polymer such as rubber-based polymer, acrylic-based polymer, vinyl-alkyl ether-based polymer, silicone-based polymer, polyester-based polymer, polyurethane-based polymer, polyether-based polymer, polyamide-based polymer or styrene-based polymer. Particularly, it is preferable to use a tackiness agent superior in transparency, weatherability, and heat resistance, such as an acrylic-based tackiness agent in which a polymer mainly containing acrylic or methacrylic alkyl ester is used as a base polymer.

The optical path control layer is disposed on the visual side of the liquid-crystal display panel. In this case, it is preferable that the surface where the light exit portions A are formed is disposed on the outside (visual side) as shown in FIG. 3, from the point of view of the efficiency of reflection by the optical path changing slopes A1 of the light exit portions A and, accordingly, improvement of luminance based on efficient utilization of light incident on the side surface.

The outer surface of the optical path control layer may be subjected to a non-glare treatment or an anti-reflection treatment in order to prevent obstruction to visibility from being caused by surface reflection of external light. The non-glare treatment may be done by making the surface have a fine prismatic structure by various systems such as: a surface roughing system using sandblasting or embossing; and a system of mixing transparent particles of silica. The anti-reflection treatment may be done by a system for forming a coherent vapor-deposited film. Alternatively, the non-glare or anti-reflection treatment may be done by a system for bonding a film to which such a fine prismatic surface structure or such a coherent film has been given. The non-glare treatment or the anti-reflection treatment may be preferably applied so that the function of the light exit portions is not disturbed as much as possible.

As described above, a light-diffusing layer may be disposed in the reflection type liquid-crystal display apparatus. The light-diffusing layer can be provided by a suitable system using a coating layer or a diffusing sheet having a fine prismatic surface structure according to the non-glare layer. Although the position of arrangement of the light-diffusing layer can be determined suitably, it is generally preferable from the point of view of stability of display quality that the light-diffusing layer is disposed between the optical path control layer and the visual side cell substrate. In this case, the light-diffusing layer may be formed as a light diffuse type adhesive layer containing transparent particles so that the light-diffusing layer can serve as an adhesive layer for bonding the transparent sheet forming the optical path control layer or as an adhesive layer for bonding a polarizer and a retarder plate to each other in order to attain reduction in thickness. Hence, one light-diffusing layer may be disposed or two or more light-diffusing layers may be disposed.

Incidentally, as the transparent particles contained in the adhesive layer, one kind or two or more kinds of suitable transparent particles maybe selected from inorganic particles and organic particles with a mean particle size of from 0.5 to 20 $\mu$m. The inorganic particles used may be electrically conductive and examples of the inorganic particles may be selected from silica, alumina, titania, zirconia, tin oxide, indium oxide, cadmium oxide, and antimony oxide. The organic particles may be selected from crosslinked or non-crosslinked polymers.

In the reflection type liquid-crystal display apparatus according to the invention, a larger part of light incident on the incidence side surface is transmitted backward by reflection according to laws of refraction through the liquid-crystal display panel, particularly through the transparent substrate in the visual side cell substrate thereof. Hence, while light is prevented from exiting (leaking) from the surface of the panel, the optical path of the light incident on the optical path changing slopes A1 of the optical path control layer is efficiently changed toward the back side cell substrate with good perpendicular directivity. The other part of the transmitted light is further transmitted backward by total reflection so as to be incident on the optical path changing slopes A1 in the rear. Hence, the optical path of the other part of the transmitted light is efficiently changed toward the back side cell substrate with good perpendicular directivity. Accordingly, there can be formed a reflection type liquid-crystal display apparatus which can use light from the illuminator or external light efficiently, which is bright, easy to view and excellent in display quality and which can be used both in an external light mode and in an illumination mode.

Incidentally, in the invention, optical devices or parts such as an optical path control layer, a liquid-crystal cell, a polarizer, and a retarder plate, for forming the reflection type liquid-crystal display apparatus maybe wholly or partially integrally laminated/fixed onto one another or may be disposed separately. From the point of view of prevention of lowering of contrast based on suppression of interface reflection, it is preferable that such optical devices or parts are fixed onto one another. A suitable transparent adhesive agent such as a tackiness agent can be used for the fixing/bonding process. The transparent adhesive layer may contain transparent particles listed as described above so that the adhesive layer exhibits a diffusing function. In addition, the optical devices or parts, particularly visual-side ones may be made to have ultraviolet absorptive power, for example, by a system for treating them with an ultraviolet absorbent such as a salicylic ether-based compound, a benzophenone-based compound, a benzotriazole-based compound, a cyanoacrylate-based compound, or a nickel complex salt-based compound.

The invention will be described below more specifically by way of example.

EXAMPLE 1

A 1.0 mm-thick epoxy resin plate was used as an upper transparent substrate, and a transparent electrode was formed on one of opposite surfaces of the upper transparent substrate. Similarly, a 0.2 mm-thick transparent epoxy resin plate was used as a lower transparent substrate, and a transparent electrode was formed on one of opposite surfaces of the lower transparent substrate. The substrates were used as a pair so that a polyvinyl alcohol solution was applied onto each of their electrode side surfaces by means of spin coating, dried and then rubbed. Thus, a rubbing film was formed on each of the electrode side surfaces of the substrates. The transparent electrode of the upper substrate was divided by etching in advance. Then, a gap adjusting material was disposed in the condition that the pair of substrates were disposed in opposition to each other so that the rubbing directions of the pair of substrates crossed perpendicularly. After the circumference of the pair of substrates was sealed with an epoxy resin, liquid crystal containing dye (tradename: D35, made by BDH Ltd.) as an additive was injected between the pair of substrates. Thus, a GH (guest-host) type liquid-crystal cell was produced.

COMPARATIVE EXAMPLE 1

A liquid-crystal panel was produced in the same manner as in Example 1 except that the thickness of the upper transparent substrate was changed to 0.6 mm and the thickness of the lower transparent substrate was changed to 0.6 mm.

Evaluation Test 1

The liquid-crystal display apparatus produced in the manner was fixed on a stainless steel plate. The state of the substrates was observed in the condition that a 10 g-weight iron ball was dropped thereon while the height of the iron ball was changed. The case where there was no substrate broken was estimated as "o" and the case where there was some substrate broken was estimated as "X" by evaluation in eye observation. Results of the evaluation were as shown in Table 1.

TABLE 1

| Height of Iron Ball to be dropped (cm) | Example 1 | Comparative Example 1 |
|---|---|---|
| 10 | ○ | ○ |
| 20 | ○ | X |
| 30 | ○ | X |
| 40 | ○ | X |
| 50 | X | X |

It was apparent from Table 1 that damage of the substrates was not observed in Example 1 even in the drop test at the height of 40 cm whereas damage of the substrates was observed in Comparative Example 1 in the drop test at the height of 20 cm. When a half of the LCD was turned on and pressed by fingers, disorder of an image was not observed in Example 1 but disorder of an image was observed in Comparative Example 1. From the description, a liquid-crystal display apparatus hard to break and little in disorder of a display image was able to be achieved according to the invention.

As described above, in accordance with the invention, the upper transparent substrate which is apt to be subjected to pressure in the liquid-crystal display apparatus is made thicker than the lower transparent substrate to thereby make it possible to enhance the stiffness of the upper transparent substrate and reduce the disorder of a display image caused by bending of the upper transparent substrate owing to external force. In addition, the lower transparent substrate made thin is improved in its flexibility. Hence, a liquid-crystal display apparatus hard to break, thin in thickness, and light in weight can be achieved even in the case where the total thickness of the apparatus is not changed. Hence, the invention is of great industrial worth.

REFERENCE EXAMPLE 1

Magnesium fluoride was applied onto a transparent plastic plate having a refractive index of 1.505 by vacuum vapor deposition to thereby form a low-refractive-index transparent layer having a thickness of 600 nm and a refractive index of 1.38 on the transparent plastic plate. An ITO transparent electrically conductive layer was formed on the low-refractive-index transparent layer. Then, the transparent electrode thereof was divided by etching and a polyvinyl alcohol solution was applied thereon by spin coating. The dried film obtained thus was subjected to a rubbing treatment to thereby obtain a visual side cell substrate. On the other hand, an ultraviolet-curable resin layer was formed on a transparent plastic plate having a refractive index of 1.505. After the ultraviolet-curable resin layer was subjected to a surface-roughening treatment, aluminum was deposited on the ultraviolet-curable resin layer to thereby form a diffuse reflection type electrode. A rubbing film was provided on the electrode in the same manner as described above. Thus, a back side cell substrate was obtained.

Then, a gap adjusting material was disposed while the visual side cell substrate and the back side cell substrate were disposed so that the rubbing directions of the respective rubbing surfaces of the two substrates crossed each other perpendicularly. After the periphery of the two substrates was sealed with an epoxy sealing resin, liquid crystal (ZLI-4792, made by Merck & Co., Inc.) was injected between the two substrates to thereby form a TN reflection type liquid-crystal cell. Polarizers (NPF EGW1225DU, made by Nitto Electric Industrial Co., Ltd.) subjected to an anti-reflection treatment and a non-glare treatment respectively were stuck onto opposite surfaces of the liquid-crystal cell. Thus, a normally white reflection type liquid-crystal panel was obtained. The size of the panel was 45 mm wide and 34 mm long. One side surface of the visual side cell substrate in the direction of the length was protruded out by 2 mm from that of the back side cell substrate. Then, a cold-cathode tube was disposed on the protruded side surface of the visual side cell substrate and enclosed by a silver-vapor-deposited polyester film. End portions of the film were bonded to upper and lower surfaces of the visual side cell substrate so that the cold-cathode tube was held and fixed.

REFERENCE EXAMPLE 2

A mold processed into a predetermined shape in advance was filled with an ultraviolet-curable acrylic resin (ARONIX UV-3701, made by Toagosei Co., Ltd.) dropwise with a dropper. A non-oriented polycarbonate (PC) film (refractive index: 1.58) 70 μm thick, still standing on the resin, was made to adhere closely thereto by a rubber roller so that excessive resin and bubbles were removed. The resin was irradiated with ultraviolet rays by a metal halide lamp. After the resin was cured, the film with the resin was separated from the mold and cut into a predetermined size. Thus, a transparent sheet having an optical path control layer with a refractive index of 1.51 was obtained.

Incidentally, the transparent sheet was 40 mm wide and 30 mm long, and had light exit portions constituted by prism-like concave portions disposed in parallel to each other and continuously at intervals of a pitch of 210 μm so that the prism-like concave portions had ridgelines each inclined at an angle of 21 degrees in the direction of the width thereof (FIG. 6). Each of the prism-like concave portions was constituted by a combination of an optical path changing slope A1 and a gentle slope C. The inclination angle of each of the optical path changing slopes A1 was 42 degrees. The inclination angle of each of the gentle slopes C was in a range of from 1.8 to 3.5 degrees. The difference between inclination angles of adjacent ones of the gentle slopes was not larger than 0.1 degree. The projected width of the optical path changing slopes on a reference plane was in a range of from 10 to 16 μm. The ratio of the projected area of the gentle slopes on the reference plane to the projected area of the optical path changing slopes on the reference plane was not smaller than 12.

REFERENCE EXAMPLE 3

A transparent sheet containing an optical path control layer was obtained in the same manner as in Reference Example 2 except that a different mode was used. The transparent sheet had 80 μm-long light exit portions (FIG. 4) each constituted by an isosceles triangle containing optical path changing slopes A1 as two sides. The inclination angle of each of the optical path changing slopes A1 was about 42 degrees. The projected width of each of the optical path changing slopes A1 on the reference plane was 10 μm. The light exit portions were disposed regularly so that the direction of the length thereof was parallel to the incidence side surface. The area of flat portions (41) were not smaller than 10 times as large as the total projected area of the optical path changing slopes on the reference plane.

REFERENCE EXAMPLE 4

A transparent sheet containing an optical path control layer was obtained in the same manner as in Reference Example 2 except that a different mode was used. The transparent sheet had 80 μm-long light exit portions (FIG. 5) each constituted by a combination of an optical path changing slope A1 and a steep slope. The inclination angle of each of the optical path changing slopes A1 was about 42 degrees. The projected width of each of the optical path changing slopes A1 on the reference plane was 10 μm. The inclination angle of each of the steep slopes was about 65 degrees. The light exit portions were disposed regularly so that the direction of the length thereof was parallel to the incidence side surface. The area of flat portions (41) were not smaller than 10 times as large as the total projected area of the optical path changing slopes and the steep slopes on the reference plane.

REFERENCE EXAMPLE 5

A transparent sheet containing an optical path control layer was obtained in the same manner as in Reference Example 2 except that a different mode was used. The transparent sheet had 80 μm-long light exit portions (FIG. 4) each constituted by an isosceles triangle containing optical path changing slopes A1 as two sides. The inclination angle of each of the optical path changing slopes A1 was about 42 degrees. The projected width of each of the optical path changing slopes A1 on the reference plane was 10 μm. The light exit portions were disposed at random so that the direction of the length thereof was parallel to the incidence side surface and so that the light exit portions became denser as the location thereof became farther from the incident side surface. The area of flat portions (41) were not smaller than 10 times as large as the total projected area of the optical path changing slopes on the reference plane.

REFERENCE EXAMPLE 6

A transparent sheet containing an optical path control layer was obtained in the same manner as in Reference Example 2 except that a different mode was used. The transparent sheet had 80 μm-long light exit portions (FIG. 5) each constituted by a combination of an optical path changing slope A1 and a steep slope. The inclination angle of each of the optical path changing slopes A1 was about 42 degrees. The projected width of each of the optical path changing slopes A1 on the reference plane was 10 μm. The inclination angle of each of the steep slopes was about 65 degrees. The light exit portions were disposed at random so that the direction of the length thereof was parallel to the incidence side surface and so that the light exit portions became denser as the location there of became father from the incidence side surface. The area of flat portions (41) were not smaller than 10 times as large as the total projected area of the optical path changing slopes and the steep slopes on the reference plane.

EXAMPLE 2

While a reflection type liquid-crystal display panel was obtained in Reference Example 1 by using a 0.6 mm-thick visual side plastic plate and a 0.2 mm-thick back side plastic plate, a transparent sheet obtained in Reference Example 2 was bonded to a visual side surface of the reflection type liquid-crystal display panel through a tacky layer having a refractive index of 1.52 and provided on the surface of the transparent sheet on which the optical path control layer was not provided. Thus, there was obtained a reflection type liquid-crystal display apparatus which could be used both in an external light mode and in an illumination mode.

COMPARATIVE EXAMPLE 2

While a reflection type liquid-crystal display panel was obtained in Reference Example 1 by using a 0.4 mm-thick visual side plastic plate and a 0.4 mm-thick back side plastic plate, a transparent sheet obtained in Reference Example 2 was bonded to a visual side surface of the reflection type liquid-crystal display panel through a tacky layer having a refractive index of 1.465 and provided on the surface of the transparent sheet on which the optical path control layer was not provided. Thus, there was obtained a reflection type liquid-crystal display apparatus which could be used both in an external light mode and in an illumination mode.

EXAMPLE 3

A reflection type liquid-crystal display apparatus which could be used both in an external light mode and in an illumination mode was obtained in the same manner as in Example 2 except that a transparent sheet obtained in Reference Example 3 was used.

COMPARATIVE EXAMPLE 3

A reflection type liquid-crystal display apparatus which could be used both in an external light mode and in an illumination mode was obtained in the same manner as in Comparative Example 2 except that a transparent sheet obtained in Reference Example 3 was used.

EXAMPLE 4

A reflection type liquid-crystal display apparatus which could be used both in an external light mode and in an illumination mode was obtained in the same manner as in Example 2 except that a transparent sheet obtained in Reference Example 4 was used.

COMPARATIVE EXAMPLE 4

A reflection type liquid-crystal display apparatus which could be used both in an external light mode and in an illumination mode was obtained in the same manner as in Comparative Example 2 except that a transparent sheet obtained in Reference Example 4 was used.

EXAMPLE 5

A reflection type liquid-crystal display apparatus which could be used both in an external light mode and in an illumination mode was obtained in the same manner as in Example 2 except that a transparent sheet obtained in Reference Example 5 was used.

COMPARATIVE EXAMPLE 5

A reflection type liquid-crystal display apparatus which could be used both in an external light mode and in an illumination mode was obtained in the same manner as in Comparative Example 2 except that a transparent sheet obtained in Reference Example 5 was used.

EXAMPLE 6

A reflection type liquid-crystal display apparatus which could be used both in an external light mode and in an illumination mode was obtained in the same manner as in Example 2 except that a transparent sheet obtained in Reference Example 6 was used.

COMPARATIVE EXAMPLE 6

A reflection type liquid-crystal display apparatus which could be used both in an external light mode and in an illumination mode was obtained in the same manner as in Comparative Example 2 except that a transparent sheet obtained in Reference Example 6 was used.

Evaluation Test 2

Frontal luminance in a position far by 5 mm from the incidence side surface, in the center portion and in a position far by 5 mm from the counter end of the reflection type liquid-crystal display apparatus obtained in each of Examples 2 to 6 and Comparative Examples 2 to 6 was measured in a dark room by a luminance meter (BM-7 made by Topcon Corp.) while the cold-cathode tube was turned on in the condition that the liquid-crystal cell was supplied with no voltage.

Results of the measurement were shown in the following Table.

|  | Frontal Luminance (cd/m$^2$) | | |
| --- | --- | --- | --- |
|  | Incidence Side Surface Portion | Center Portion | Counter End Portion |
| Example 2 | 140 | 90 | 75 |
| Comparative Example 2 | 92 | 58 | 49 |
| Example 3 | 122 | 84 | 63 |
| Comparative Example 3 | 82 | 52 | 42 |
| Example 4 | 130 | 75 | 50 |
| Comparative Example 4 | 86 | 51 | 23 |
| Example 5 | 125 | 123 | 121 |
| Comparative Example 5 | 80 | 79 | 78 |
| Example 6 | 131 | 131 | 129 |
| Comparative Example 6 | 85 | 84 | 82 |

It was apparent from the table that bright display in an illumination mode was achieved in Examples 2 to 6 and excellent uniformity of brightness on the whole surface of the panel was obtained particularly in Examples 5 and 6 in which the density of the light exit portions increased as the location thereof came from the light source side to the counter surface. On the other hand, it was apparent that Comparative Examples 2 to 6 were inferior in luminance in all conditions to Examples 10 to 6.

Evaluation Test 3

After the reflection type liquid-crystal display apparatus obtained in each of Example 2 and Comparative Example 2 was fixed on a stainless steel plate, a 10 g-weight iron ball was dropped on the reflection type liquid-crystal display apparatus from a predetermined height. A judgment was made by eye observation as to whether the panel was broken or not. The case where the panel was not broken was estimated as "o" and the case where the panel was broken was estimated as "X". Results of the evaluation were shown in the following Table. It was apparent from the Table that the substrate in Example 2 was not damaged unless the iron ball was dropped on the substrate from the height larger than 40 cm whereas the substrate in Comparative Example 2 was damaged when the iron ball was dropped the substrate from the height of 20 cm.

| Dropping Height (cm) | 10 | 20 | 30 | 40 | 50 |
| --- | --- | --- | --- | --- | --- |
| Example 2 | O | O | O | O | X |
| Comparative Example 2 | O | X | X | X | X |

On the other hand, a display state in an external light mode in which the light source was turned off was observed in Examples 2 to 6. As a result, the display state was bright and excellent in display quality. It is to be understood from the description that the invention can form a reflection type liquid-crystal display apparatus, which can emit light in a simple condition that an illuminator is disposed on a side surface of a liquid-crystal display panel while increase in volume and weight caused by use of a related-art side light pipe is avoided, which is thin and hard to break and which can be used both in an external light mode and in an illumination mode.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A reflection type liquid-crystal display apparatus comprising:
    a reflection type liquid-crystal display panel;
    at least one illuminator; and
    an optical path control layer;
    wherein the liquid-crystal display panel comprises a liquid-crystal cell and a reflection layer, the liquid-crystal cell including a back side cell substrate, a visual side cell substrate, and a layer of liquid crystal, the back side cell substrate including a support substrate and an electrode provided on the support substrate, the visual side cell substrate including a transparent substrate and a transparent electrode provided on the transparent substrate, the transparent substrate in the visual side cell substrate being thicker than the support substrate in the back side cell substrate, the layer of liquid crystal being held between the back side cell substrate and the visual side cell substrate with their respective electrodes disposed opposite to each other, the reflection layer being provided at the back of the liquid-crystal layer in the liquid-crystal cell so that external light incident on an outer surface of the visual side cell substrate is reflected by the reflection layer and so that display light transmitted through the liquid-crystal layer is made to exit from the visual side cell substrate so as to be viewed, the illuminator being disposed on at least one of side surfaces of the visual side cell substrate, the optical path control layer having a thickness of in a range from 10 to 300 μm and provided with light exit portions on the outer surface side of the visual side cell substrate, the light exit portions including optical path changing slopes by which light incident on the side surface through the illuminator is reflected toward the back side cell substrate, each of the optical path changing slopes being inclined at an inclination angle of from 35 to 48 degrees with respect to a reference plane of the liquid-crystal display panel.

2. A reflection type liquid-crystal display apparatus according to claim 1, wherein the support substrate in the back side cell substrate has a thickness of not larger than ⅔ as large as a thickness of the transparent substrate in the visual side cell substrate.

3. A reflection type liquid-crystal display apparatus according to claim 1, wherein the visual side cell substrate further includes a transparent layer with a refractive index lower than that of the transparent substrate, and the illuminator is disposed on the side surface of the visual side cell substrate.

4. A reflection type liquid-crystal display apparatus according to claim 1, wherein the liquid-crystal display panel further comprises one polarizer disposed on at least one of opposite surfaces of the liquid-crystal cell.

5. A reflection type liquid-crystal display apparatus according to claim 4, wherein the polarizer is interposed between the liquid-crystal cell and the optical path control layer.

6. A reflection type liquid-crystal display apparatus according to claim 5, wherein the liquid-crystal display panel further comprise a retarder plate interposed between the liquid crystal cell and the polarizer.

7. A reflection type liquid-crystal display apparatus according to claim 1, wherein the light exit portions in the optical path control layer comprise prism-like concave portions, and the optical path changing slopes in the light exit portions face the side surface on which the illuminator is disposed.

8. A reflection type liquid-crystal display apparatus according to claim 7, wherein each of the prism-like concave portions is shaped like an approximate triangle in cross sectional view of the optical path changing slopes.

9. A reflection type liquid-crystal display apparatus according to claim 7, wherein each of the prism-like concave portions comprise a groove continuous from one end to the other end of the optical path control layer, and each of the optical path changing slopes in the grooves is parallel or inclined to the side surface on which the illuminator is disposed.

10. A reflection type liquid-crystal display apparatus according to claim 7, wherein each of the prism-like concave portions comprise a small groove shaped like an approximate triangle in section and based on cross section of each of the optical path changing slopes, a length of a long side in each of the optical path changing slopes is not smaller than 5 times as large as the depth of the small groove, and the light exit portions contain a plurality of the small grooves distributed discontinuously and irregularly in a surface of the optical path control layer.

11. A reflection type liquid-crystal display apparatus according to claim 1, wherein the optical path control layer comprises a transparent sheet and bonded to the outer surface side of the visual side cell substrate by an adhesive layer having a refractive index higher than that of the transparent substrate in the visual side cell substrate.

12. A reflection type liquid-crystal display apparatus according to claim 1, wherein the illuminator is disposed on at least one of side surfaces of the transparent substrate of the visual side cell substrate.

13. A reflection type liquid-crystal display apparatus according to claim 1, wherein the visual side cell substrate further includes a low-refractive-index transparent layer interposed between the transparent substrate and the transparent electrode, the low-refractive-index transparent layer having a refractive index lower than that of the transparent substrate.

* * * * *